United States Patent
Li

(10) Patent No.: US 9,588,282 B2
(45) Date of Patent: Mar. 7, 2017

(54) LIQUID CRYSTAL MODULE AND LCD

(71) Applicant: Shenzhen China Star Optoelectronics Technology Co., Ltd., Shenzhen, Guangdong (CN)

(72) Inventor: Quan Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 323 days.

(21) Appl. No.: 14/379,047

(22) PCT Filed: May 6, 2014

(86) PCT No.: PCT/CN2014/076859
§ 371 (c)(1),
(2) Date: Aug. 15, 2014

(87) PCT Pub. No.: WO2015/165126
PCT Pub. Date: Nov. 5, 2015

(65) Prior Publication Data
US 2016/0238779 A1      Aug. 18, 2016

(30) Foreign Application Priority Data

Apr. 30, 2014      (CN) .......................... 2014 1 0179856

(51) Int. Cl.
*G02F 1/1333*      (2006.01)
*F21V 8/00*      (2006.01)
*G02F 1/1335*      (2006.01)

(52) U.S. Cl.
CPC ......... *G02B 6/0088* (2013.01); *G02B 6/0023* (2013.01); *G02B 6/0055* (2013.01); *G02B 6/0085* (2013.01); *G02F 1/1336* (2013.01); *G02F 1/133308* (2013.01); *G02F 1/133615* (2013.01); *G02F 2001/133317* (2013.01); *G02F 2001/133614* (2013.01); *G02F 2202/36* (2013.01)

(58) Field of Classification Search
CPC .. G02B 6/0088; G02B 6/0023; G02B 6/0055; G02B 6/0085; G02F 1/133308; G02F 2001/133314; G02F 2001/133317
See application file for complete search history.

(56) References Cited

U.S. PATENT DOCUMENTS

| | | | |
|---|---|---|---|
| 2012/0248791 A1* | 10/2012 | Chu | E05C 1/10 292/128 |
| 2013/0050612 A1* | 2/2013 | Hur | G02F 1/133603 349/62 |

(Continued)

*Primary Examiner* — Michael Caley
*Assistant Examiner* — Jonathan Y Jung
(74) *Attorney, Agent, or Firm* — Andrew C. Cheng

(57) ABSTRACT

A liquid crystal module includes a back bezel (1), a side-in backlight source (3), a light guide plate (2) having a light-in side opposite to the side-in backlight source (3), a quantum bar (5) between the side-in backlight source (3) and the light guide plate (2), a first support (6) having first windows (60) on top, and a second support (7) having second windows (70) on top. The quantum bar (5) is placed in a room formed by the first support (6) and the second support (7). The present invention also proposes a liquid crystal display. The liquid crystal module is assembled easily and reduces breakage risk for the quantum bar glass tubes.

18 Claims, 6 Drawing Sheets

(56) References Cited

U.S. PATENT DOCUMENTS

| | | | | |
|---|---|---|---|---|
| 2013/0271700 A1* | 10/2013 | Nakamura | ............ | G02B 6/0026 349/65 |
| 2013/0329161 A1* | 12/2013 | Park | .................. | G02F 1/133615 349/58 |
| 2013/0336003 A1* | 12/2013 | Yang | ........................ | G02B 6/42 362/608 |
| 2014/0240644 A1* | 8/2014 | Abe | ..................... | G02B 6/0088 349/71 |

* cited by examiner

LIQUID CRYSTAL MODULE AND LCD

CROSS REFERENCE TO RELATED APPLICATION

The present application is based on, and claims priority from, Chinese application number 201410179856.X, filed Apr. 30, 2014, the disclosure of which is hereby incorporated by reference herein in its entirety.

BACKGROUND OF THE INVENTION

1. Field of the Invention

The present invention relates to a liquid crystal display technology field, more particularly, to a liquid crystal module and a liquid crystal display (LCD).

2. Description of the Prior Art

Quantum Dot (QD) technique is a semi-conductive nano material structure technology that binding up electrons in limited space and consists of ultra small crystal compounds in 1~100 nm. The technique applied in lighting and displaying fields is that precisely controlling size of crystals to exactly control colors with considerably broad ranges according to the character of changing wavelength of incident light and controlling the wavelength by crystals in different sizes.

QD has been applied in liquid crystal display technology that providing broader color display range and lower power consumption for a display device to avoid a disadvantage that the color displayed in LCD is worse than Plasma and Organic Light-Emitting Diode (OLED) do. Owing to insufficient heat resistance of relative material in QD and prone to Oxidation etching, it forms quantum bars by transparent glass tube packaging. Therefore, it is an important issue at present that how to simply and safely fix quantum bars in an LCD.

SUMMARY OF THE INVENTION

An object of the present invention is to solve the technical problem by providing a liquid crystal module and an LCD to easily and safely fixing inward quantum bars.

According to the present invention, a liquid crystal module comprises a back bezel, a side-in backlight source, a light guide plate above the back bezel, having a light-in side opposite to the side-in backlight source, and a light-out side, a quantum bar between the side-in backlight source and the light guide plate, a first support, a plurality of first windows arranging in the first support, and a second support, a plurality of second windows arranging in the second support, the second support being for buckling the first support in a direction along which light from the side-in backlight source projects. The first support and the second support form a room. The quantum bar is placed in the room. The blight from the side-in backlight source projects to the light-in side of the light guide plate through the second windows, the quantum bar and the first windows.

In one aspect of the present invention, the first support comprises a first body plate, the plurality of first windows are arranged in the first body plate at an interval. Two sides of the first body plate respectively extend to form a first and a second extension boards. The first body plate, the first extension board and the second extension board are approximately shaped as "]", wherein one side of an end of each of the first and the second extension boards forms a convex strip with a hook.

In another aspect of the present invention, the first support further comprises a third extension board, oppositely extended from the second extension board and shaped as a step, for adhering to the back bezel.

In another aspect of the present invention, the second support further comprises a second body plate, the plurality of second windows are arranged in the second body plate at an interval. A fourth extension board and a fifth extension board are respectively extended from two sides of the second body plate. The second body plate, the fourth extension board and the fifth extension board are approximately shaped as "[". One side of an end of each of the fourth extension board and the fifth extension board has a first groove, and the two first grooves are for respectively fitting to the convex strips on the first extension board and the second extension board.

In another aspect of the present invention, the other side of the ends of each of the fourth extension board and the fifth extension board forms a second groove, and gaps are evenly set up on the fourth extension board and the fifth extension board, and the gaps on the fourth extension board respectively locate between each two adjacent second windows, the gaps on the fifth extension board respectively locate between the each two adjacent second windows.

In another aspect of the present invention, the plurality of first windows in the first support align with the second windows in the second support one by one, and a size of each of the first windows is larger than that of the second windows.

In another aspect of the present invention, a heat sink is set up between the back bezel and the light guide plate, and the third extension board is set up above the heat sink.

In still another aspect of the present invention, the liquid crystal module further comprises a reflector between the light guide plate and the heat sink, a middle frame above the first support and the second support, an optical film set above the light guide plate, at least part of the optical film set above the middle frame, and a plastic frame comprising a second bottom plate and a second side plate, the second side plate fixed to the back bezel, and at least part of the second bottom plate covering edge of the optical film set.

In yet another aspect of the present invention, the first support and the second support are made of heat-resistant polymer materials.

According to the present invention, a liquid crystal display comprises a liquid crystal module. The liquid crystal module comprises a back bezel, a side-in backlight source, a light guide plate above the back bezel, having a light-in side opposite to the side-in backlight source, and a light-out side, a quantum bar between the side-in backlight source and the light guide plate, a first support, a plurality of first windows arranging in the first support, and a second support, a plurality of second windows arranging in the second support, the second support being for buckling the first support in a direction along which light from the side-in backlight source projects. The first support and the second support form a room. The quantum bar is placed in the room. The light from the side-in backlight source projects to the light-in side of the light guide plate through the second windows, the quantum bar and the first windows.

In one aspect of the present invention, the first support comprises a first body plate, the plurality of first windows are arranged in the first body plate at an interval. Two sides of the first body plate respectively extend to form a first and a second extension boards. The first body plate, the first extension board and the second extension board are approximately shaped as "]", wherein one side of an end of each of the first and the second extension boards forms a convex strip with a hook.

In another aspect of the present invention, the first support further comprises a third extension board, oppositely extended from the second extension board and shaped as a step, for adhering to the back bezel.

In another aspect of the present invention, the second support further comprises a second body plate, the plurality of second windows are arranged in the second body plate at an interval. A fourth extension board and a fifth extension board are respectively extended from two sides of the second body plate. The second body plate, the fourth extension board and the fifth extension board are approximately shaped as "[". One side of an end of each of the fourth extension board and the fifth extension board has a first groove, and the two first grooves are for respectively fitting to the convex strips on the first extension board and the second extension board.

In another aspect of the present invention, the other side of the ends of each of the fourth extension board and the fifth extension board forms a second groove, and gaps are evenly set up on the fourth extension board and the fifth extension board, and the gaps on the fourth extension board respectively locate between each two adjacent second windows, the gaps on the fifth extension board respectively locate between the each two adjacent second windows.

In another aspect of the present invention, the plurality of first windows in the first support align with the second windows in the second support one by one, and a size of each of the first windows is larger than that of the second windows.

In another aspect of the present invention, a heat sink is set up between the back bezel and the light guide plate, and the third extension board is set up above the heat sink.

In still another aspect of the present invention, the liquid crystal module further comprises a reflector between the light guide plate and the heat sink, a middle frame above the first support and the second support, an optical film set above the light guide plate, at least part of the optical film set above the middle frame, and a plastic frame comprising a second bottom plate and a second side plate, the second side plate fixed to the back bezel, and at least part of the second bottom plate covering edge of the optical film set.

In yet another aspect of the present invention, the first support and the second support are made of heat-resistant polymer materials.

Beneficial effects of an embodiment of the present invention are: arranging the quantum bars inside room formed by a first support and a second support, and the fixing arrangement of quantum bars are quite convenient so that both supports are assembled easily. Furthermore, a second groove and gaps set up on the second support increases flexibility to enhance safety of the quantum bars in the room so that it reduces breakage risk for the quantum bar glass tubes to improve the yield.

BRIEF DESCRIPTION OF THE DRAWINGS

For better understanding embodiments of the present invention, the following detailed description taken in conjunction with the accompanying drawings is provided. Apparently, the accompanying drawings are merely for some of the embodiments of the present invention. Any ordinarily skilled person in the technical field of the present invention could still obtain other accompanying drawings without use laborious invention based on the present accompanying drawings.

DETAILED DESCRIPTION OF THE PREFERRED

The accompanying drawings are included to provide a further understanding of the invention. The drawings illustrate embodiments of the invention and, together with the description, serve to explain the principles of the invention.

Figure 1:
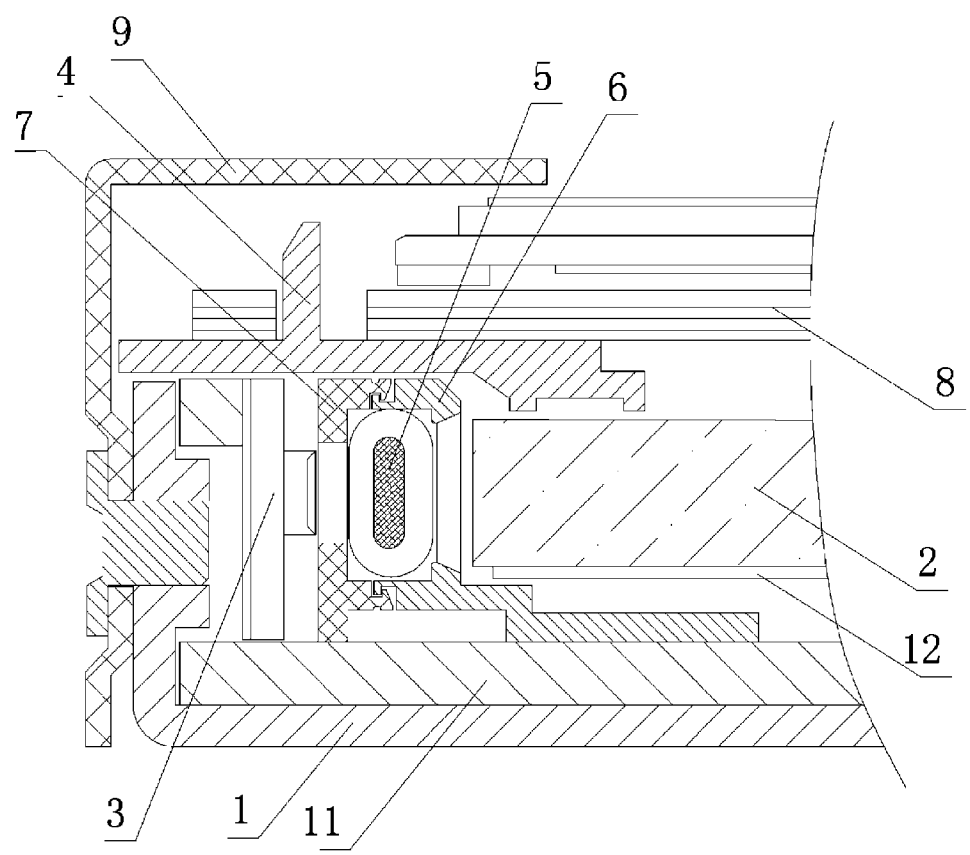
FIG. 1 shows a schematic diagram of a liquid crystal module according to a preferred embodiment of the present invention.
Figure 2:
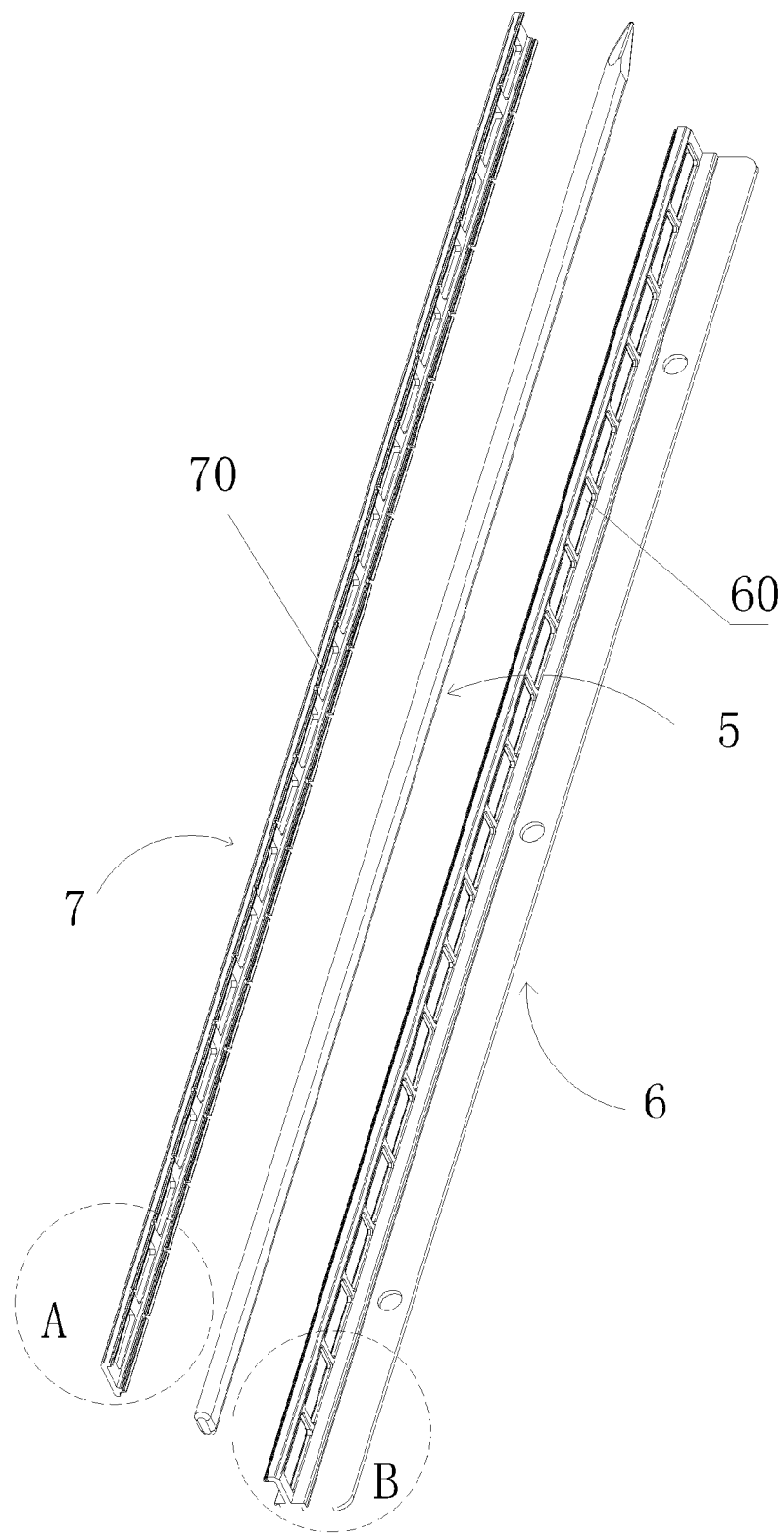
FIG. 2 shows an exploded diagram of the device for fixing the quantum bar as shown in FIG. 1.
Figure 3:
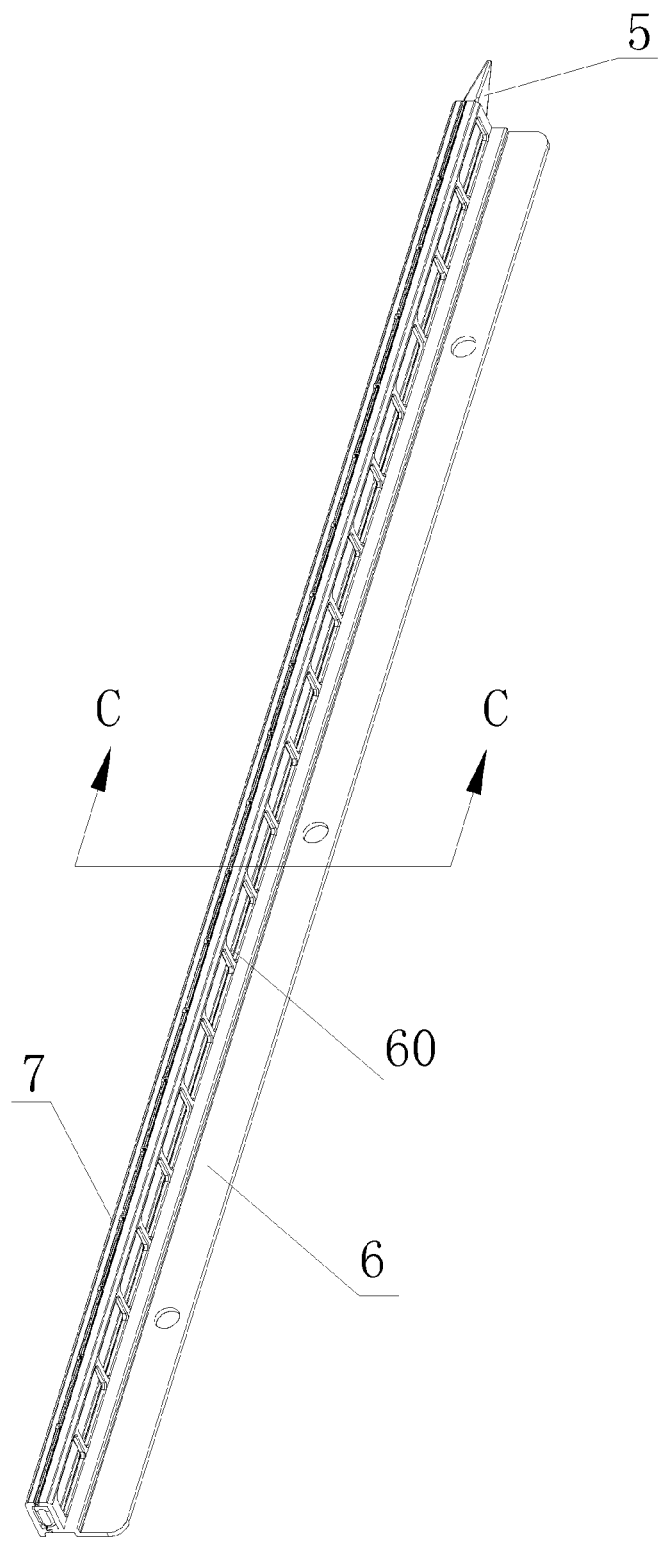
FIG. 3 shows an assembled device for fixing the quantum bar as shown in FIG. 1.
Figure 4:
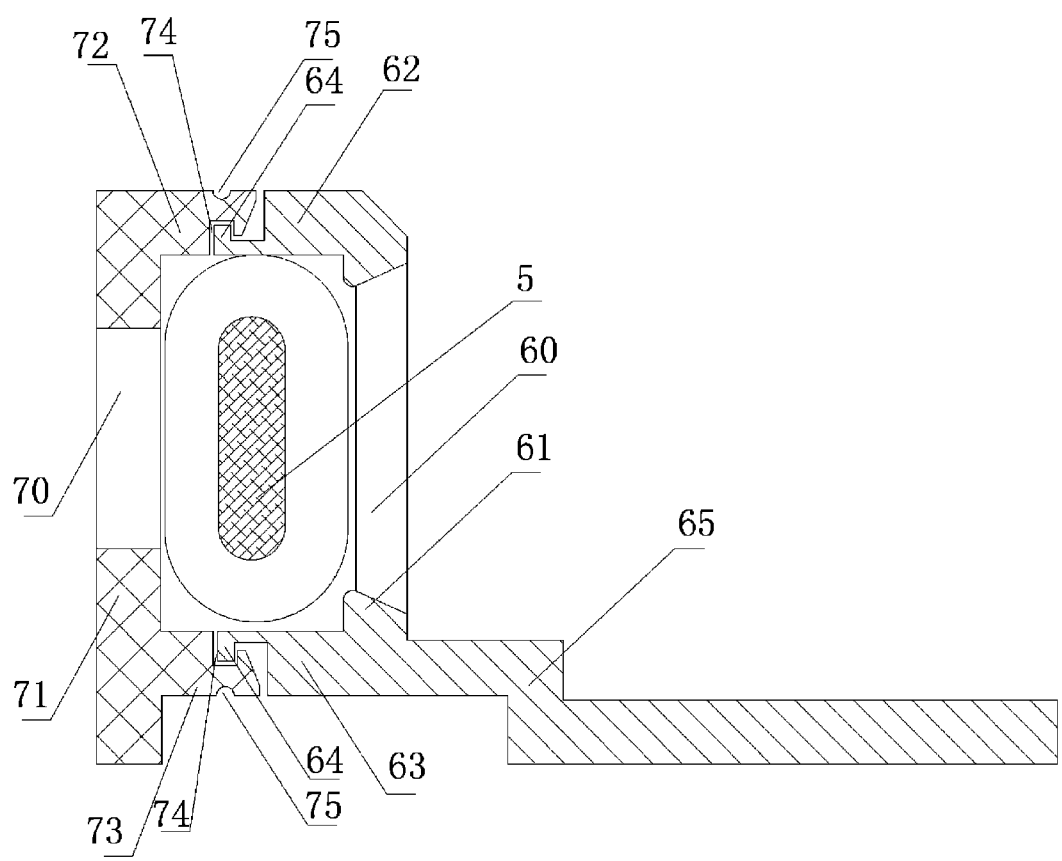
FIG. 4 shows a cross-sectional view along a line C-C shown in FIG. 3.
Figure 5:
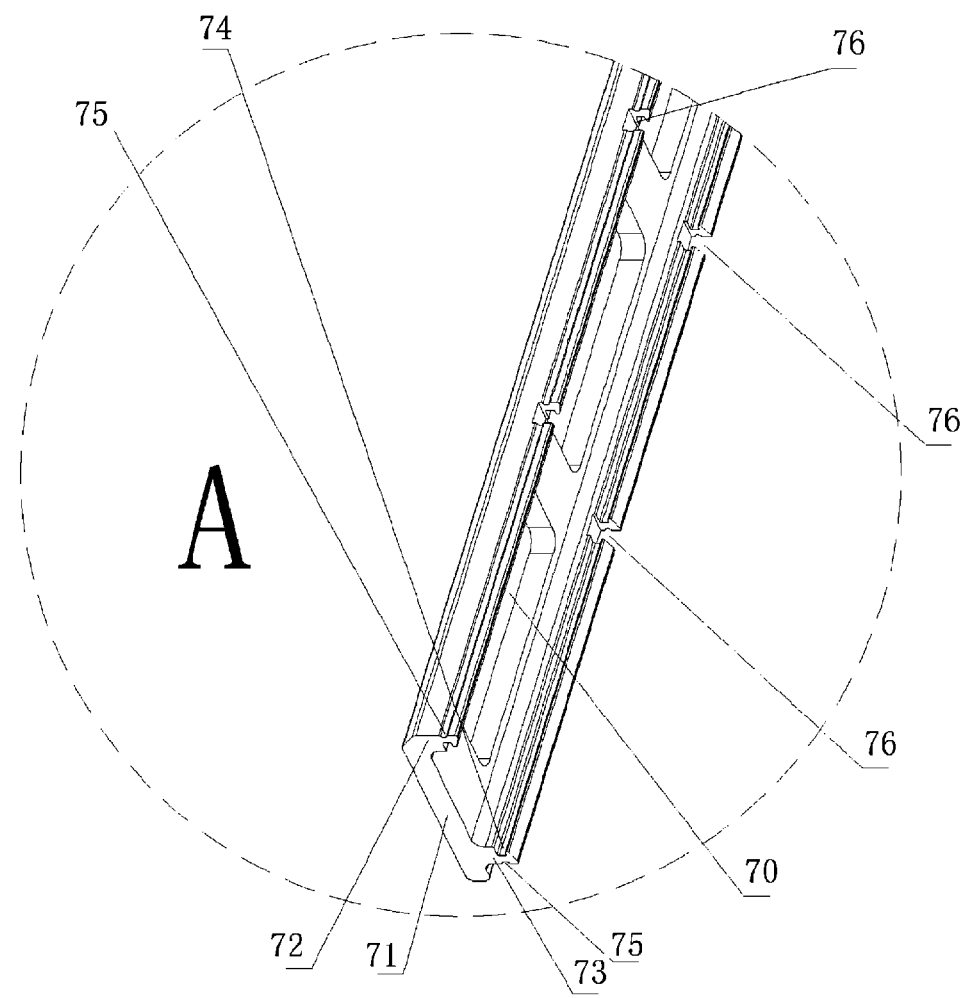
FIG. 5 shows an enlarged diagram of doted region A shown in FIG. 2.
Figure 6:
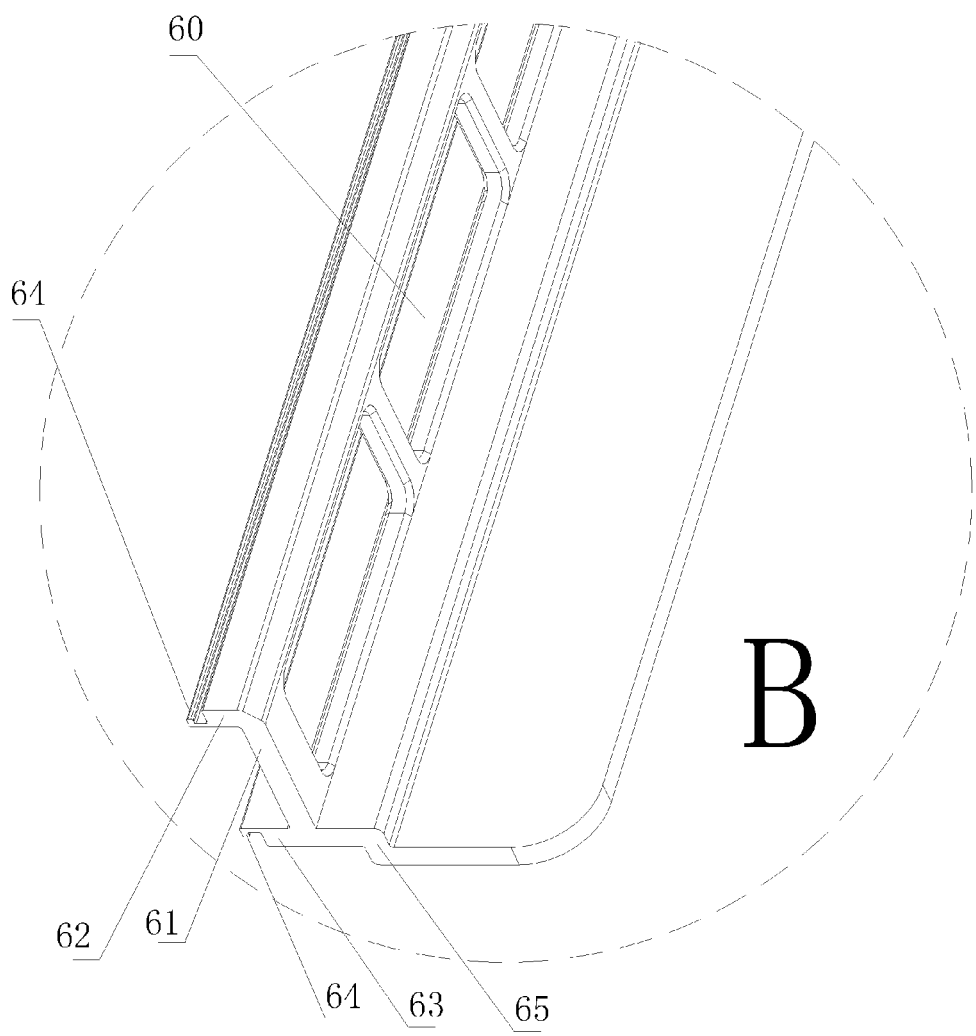
FIG. 6 shows an enlarged diagram of doted region B shown in FIG. 2.

Refer to FIG. 1 to FIG. 6 in conjunction, The figures illustrate a liquid crystal module of an embodiment according to the present invention. In the embodiment, the liquid crystal module at least comprises:

a back bezel 1 comprising a first bottom plate and a first side plate;

a side-in backlight source 3 comprising a light-emitting diode (LED) light strip with a plurality of LED lights;

a light guide plate 2 set up above the first bottom plate of the back bezel 1 and light-in and light-out sides, the light-in side is opposite to the side-in backlight source 3;

a quantum bar 5 set up between the side-in backlight source 3 and the light guide plate 2 by transparent glass tube packaging;

a first support 6, arranging a plurality of first windows 60 arranging in the first support;

a second support 7, a plurality of second windows 70 arranging in the second support, the second support being for buckling the first support 6 in a direction along which light from the side-in backlight source projects;

the first support 6 and the second support 7 together form a room for accommodating the quantum bar 5, and the light from the LED lights of the side-in backlight source 3 projects to the light-in side of the light guide plate 2 through the second windows 70, the quantum bar 5 and the first windows 60.

Specifically, the first support 6 comprises a first body plate 61, the plurality of first windows 60 are arranged in the first body plate 61 at an interval, a first extension board 62 and a second extension board 63 are respectively extended from two sides of the first body plate 61, and the first body plate 61, the first extension board 62 and the second extension board 63 are approximately shaped as "]". One side of an end of each of the first extension board 62 and the second extension board 63 has a convex strip 64 with a hook. The first support 6 further comprises a third extension board 65, oppositely extended from the second extension board 63 and is shaped as a step for adhering to the back bezel 1.

The second support 7 comprises: a second body plate 71, the plurality of second windows 70 are arranged in the second body plate 71 at an interval, a fourth extension board 72 and a fifth extension board 73 are respectively extended from two sides of the second body plate 71, and the second body plate 71, the fourth extension board 72 and the fifth extension board 73 are approximately shaped as "[". One side of an end of each of the fourth extension board 72 and the fifth extension board 73 has a first groove 74, and the two first grooves 74 are for respectively coordinating to the convex strips 64 on the first extension board 62 and the second extension board 63. In hence, the first support 6 is rapidly assembled to the second support 7.

To enhance flexibility of the second support 7, the other side of the ends of each of the fourth extension board 72 and the fifth extension board 73 forms a second groove 75, and gaps 76 are evenly set up on the fourth extension board 72 and the fifth extension board 73, wherein the gaps 76 on the fourth extension board 72 respectively locate between each two adjacent second windows 70, the gaps 76 on the fifth extension board 73 respectively locate between the each two adjacent second windows 70.

The plurality of the first windows 60 in the first support 6 are opposite to the second windows 70 in the second support 7 one by one, and each of the second windows 70 faces one of the LED lights of the side-in backlight source 3. Besides that, a size of each of the first windows 60 is larger than that of the second windows 70 that allows much light to project to the light guide plate 2 as possible.

Furthermore, a heat sink 11 is set up between the back bezel 1 and the light guide plate 2, and the third extension board 65 is set up above the heat sink 11.

In addition, the liquid crystal module further comprises:
a reflector 12 between the light guide plate 2 and the heat sink 11;
a middle frame 4 above the first support 6 and the second support 7;
an optical film set 8 above the light guide plate 2, at least part of the optical film set 8 above the middle frame 4;
a plastic frame 9 comprising a second bottom plate and a second side plate, the second side plate fixed to the back bezel 1, at least part of the second bottom plate covering the edge of the optical film set 8.

The first support 6 and the second support 7 are made of heat-resistant polymer materials. An assembling order of the present invention is that arranging the fragile glass tube comprising the quantum bar 5 in the groove formed by the second support 7 and then buckling the first support 6. The hook on the convex strip 64 of the first support 6 fits the first groove 74 of the second support 7 to buckle rapidly. Therefore, the quantum bar 5 is fixed inside the room formed by the first support 6 and the second support 7.

Correspondently, the present invention also provides an LCD which adopting the liquid crystal module in FIG. 1 to FIG. 6. Here is no further description because of the above-mentioned detail.

Benefits of the embodiment according to the present invention are: arranging the quantum bar inside the room formed by the first support and the second support, and the fixing arrangement of quantum bars are quite convenient so that both supports are assembled easily. Furthermore, the second groove and gaps set up on the second support increases flexibility to enhance safety of the quantum bar in the room so that it reduces breakage risk for the quantum bar glass tubes to improve the yield.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A liquid crystal module comprising:
a back bezel;
a side-in backlight source;
a light guide plate above the back bezel, having a light-in side opposite to the side-in backlight source, and a light-out side;
a quantum bar between the side-in backlight source and the light guide plate;
a first support, a plurality of first windows arranging in the first support;
a second support, a plurality of second windows arranging in the second support, the second support being for buckling the first support in a direction along which light from the side-in backlight source projects;
wherein the first support and the second support form a room, the quantum bar is placed in the room, and the light from the side-in backlight source projects to the light-in side of the light guide plate through the second windows, the quantum bar and the first windows.

2. The liquid crystal module of claim 1, wherein the first support comprises:
a first body plate, the plurality of first windows being arranged in the first body plate at an interval, two sides of the first body plate respectively extending to form a first and a second extension boards, and the first body plate, the first extension board and the second extension board being approximately shaped as "]", wherein one side of an end of each of the first and the second extension boards forms a convex strip with a hook.

3. The liquid crystal module of claim 2, wherein the first support further comprises:
a third extension board, oppositely extended from the second extension board and shaped as a step, for adhering to the back bezel.

4. The liquid crystal module of claim 3, wherein the second support further comprises:
a second body plate, the plurality of second windows being arranged in the second body plate at an interval, a fourth extension board and a fifth extension board being respectively extended from two sides of the second body plate, and the second body plate, the fourth extension board and the fifth extension board being approximately shaped as "[", wherein one side of an end of each of the fourth extension board and the fifth extension board has a first groove, and the two first grooves are for respectively fitting to the convex strips on the first extension board and the second extension board.

5. The liquid crystal module of claim 4, wherein the other side of the ends of each of the fourth extension board and the fifth extension board forms a second groove, and gaps are evenly set up on the fourth extension board and the fifth extension board, and the gaps on the fourth extension board respectively locate between each two adjacent second windows, the gaps on the fifth extension board respectively locate between the each two adjacent second windows.

6. The liquid crystal module of claim 5, wherein the plurality of first windows in the first support align with the second windows in the second support one by one, and a size of each of the first windows is larger than that of the second windows.

7. The liquid crystal module of claim 6, wherein a heat sink is set up between the back bezel and the light guide plate, and the third extension board is set up above the heat sink.

8. The liquid crystal module of claim 7 further comprising:
   a reflector between the light guide plate and the heat sink;
   a middle frame above the first support and the second support;
   an optical film set above the light guide plate, and at least part of the optical film set above the middle frame;
   a plastic frame comprising a second bottom plate and a second side plate, the second side plate fixed to the back bezel, and at least part of the second bottom plate covering edge of the optical film set.

9. The liquid crystal module of claim 8, wherein the first support and the second support are made of heat-resistant polymer materials.

10. A liquid crystal display comprising a liquid crystal module, the liquid crystal module comprising:
   a back bezel;
   a side-in backlight source;
   a light guide plate above the back bezel, having a light-in side opposite to the side-in backlight source, and a light-out side;
   a quantum bar between the side-in backlight source and the light guide plate;
   a first support, a plurality of first windows arranging in the first support;
   a second support, a plurality of second windows arranging in the second support, the second support being for buckling the first support in a direction along which light from the side-in backlight source projects;
   wherein the first support and the second support form a room, the quantum bar is placed in the room, and the light from the side-in backlight source projects to the light-in side of the light guide plate through the second windows, the quantum bar and the first windows.

11. The liquid crystal display of claim 10, wherein the first support comprises:
   a first body plate, the plurality of first windows being arranged in the first body plate at an interval, two sides of the first body plate respectively extending to form a first and a second extension boards, and the first body plate, the first extension board and the second extension board being approximately shaped as "]", wherein one side of an end of each of the first and the second extension boards forms a convex strip with a hook.

12. The liquid crystal display of claim 11, wherein the first support further comprises:
   a third extension board, oppositely extended from the second extension board and shaped as a step, for adhering to the back bezel.

13. The liquid crystal display of claim 12, wherein the second support further comprises:
   a second body plate, the plurality of second windows being arranged in the second body plate at an interval, a fourth extension board and a fifth extension board being respectively extended from two sides of the second body plate, and the second body plate, the fourth extension board and the fifth extension board being approximately shaped as "[", wherein one side of an end of each of the fourth extension board and the fifth extension board has a first groove, and the two first grooves are for respectively fitting to the convex strips on the first extension board and the second extension board.

14. The liquid crystal display of claim 13, wherein the other side of the ends of each of the fourth extension board and the fifth extension board forms a second groove, and gaps are evenly set up on the fourth extension board and the fifth extension board, and the gaps on the fourth extension board respectively locate between each two adjacent second windows, the gaps on the fifth extension board respectively locate between the each two adjacent second windows.

15. The liquid crystal display of claim 14, wherein the plurality of first windows in the first support align with the second windows in the second support one by one, and a size of each of the first windows is larger than that of the second windows.

16. The liquid crystal display of claim 15, wherein a heat sink is set up between the back bezel and the light guide plate, and the third extension board is set up above the heat sink.

17. The liquid crystal display of claim 16 further comprising:
   a reflector between the light guide plate and the heat sink;
   a middle frame above the first support and the second support;
   an optical film set above the light guide plate, and at least part of the optical film set above the middle frame;
   a plastic frame comprising a second bottom plate and a second side plate, the second side plate fixed to the back bezel, and at least part of the second bottom plate covering edge of the optical film set.

18. The liquid crystal display of claim 17, wherein the first support and the second support are made of heat-resistant polymer materials.

* * * * *